(12) United States Patent
Palaniappan (10) Patent No.: US 12,091,188 B2
(45) Date of Patent: Sep. 17, 2024

(54) AIRCRAFT LIGHTING HEALTH MONITORING SYSTEM

(71) Applicant: Goodrich Corporation, Charlotte, NC (US)

(72) Inventor: Elangovan Palaniappan, Bangalore (IN)

(73) Assignee: GOODRICH CORPORATION, Charlotte, NC (US)

( * ) Notice: Subject to any disclaimer, the term of this patent is extended or adjusted under 35 U.S.C. 154(b) by 530 days.

(21) Appl. No.: 17/134,338

(22) Filed: Dec. 26, 2020

(65) Prior Publication Data

US 2021/0323692 A1 Oct. 21, 2021

(30) Foreign Application Priority Data

Apr. 17, 2020 (IN) .............................. 202041016644

(51) Int. Cl.
*B64D 45/00* (2006.01)
*B64D 43/00* (2006.01)
*B64D 47/02* (2006.01)
*B64F 5/60* (2017.01)

(52) U.S. Cl.
CPC ............. *B64D 45/00* (2013.01); *B64D 43/00* (2013.01); *B64D 47/02* (2013.01); *B64F 5/60* (2017.01); *B64D 2045/0085* (2013.01)

(58) Field of Classification Search
CPC ........ B64D 45/00; B64D 43/00; B64D 47/02; B64D 2045/0085; B64F 5/60
See application file for complete search history.

(56) References Cited

U.S. PATENT DOCUMENTS

| 7,675,248 | B2 | 3/2010 | Mubaslat et al. |
| 8,890,418 | B2 | 11/2014 | Mohan et al. |
| 10,383,191 | B2 | 8/2019 | Jayawardena et al. |
| 10,514,415 | B2 | 12/2019 | Jayawardena et al. |

(Continued)

FOREIGN PATENT DOCUMENTS

| EP | 3476746 | 5/2019 |
| EP | 3572333 | 11/2019 |

(Continued)

OTHER PUBLICATIONS

European Patent Office, European Search Report dated Sep. 8, 2021 in Application No. 21168447.7.

*Primary Examiner* — James J Lee
*Assistant Examiner* — Wenyuan Yang
(74) *Attorney, Agent, or Firm* — SNELL & WILMER L.L.P.

(57) ABSTRACT

An aircraft lighting health monitoring system is disclosed. Aircraft lights include each include one or more sensors. Multiple lights having such a sensor(s) are operatively interconnected with this common aircraft lighting health monitoring system. A CPU of this aircraft lighting health monitoring system may be maintained in a sleep mode until needed to assess sensor data of a first data classification, at which time the CPU is used for this assessment and outputs an appropriate health status communication to one or more displays. A DMA controller of the aircraft lighting health monitoring system may be used to handle sensor data of a second data classification (e.g., to control storage of such sensor data).

8 Claims, 10 Drawing Sheets

(56) References Cited

U.S. PATENT DOCUMENTS

| | | | |
|---|---|---|---|
| 2008/0278350 A1* | 11/2008 | Berkhahn | G16Z 99/00 340/945 |
| 2010/0148940 A1* | 6/2010 | Gelvin | H01Q 9/0464 340/286.02 |
| 2011/0309746 A1 | 12/2011 | Eckel et al. | |
| 2012/0095622 A1* | 4/2012 | Lynch | G07C 5/08 701/3 |
| 2017/0202068 A1 | 7/2017 | Dickey et al. | |
| 2017/0253336 A1 | 9/2017 | Matsui et al. | |
| 2019/0037669 A1* | 1/2019 | Hieb | H05B 47/20 |
| 2019/0079575 A1* | 3/2019 | Hanson | G11C 5/148 |
| 2021/0216482 A1* | 7/2021 | Winblad | G06F 13/28 |

FOREIGN PATENT DOCUMENTS

| | | |
|---|---|---|
| GB | 2406200 | 3/2005 |
| WO | 2015195187 | 12/2015 |
| WO | 2018140659 | 8/2018 |

* cited by examiner

AIRCRAFT LIGHTING HEALTH MONITORING SYSTEM

CROSS-REFERENCE TO RELATED APPLICATIONS

This application claims priority to, and the benefit of, India Patent Application No. 202041016644, filed Apr. 17, 2020 and titled "AIRCRAFT LIGHTING HEALTH MONITORING SYSTEM," which is incorporated by reference herein in its entirety for all purposes.

FIELD

The present disclosure generally relates to aircraft and, more particularly, to monitoring the health of aircraft lights.

BACKGROUND

Aircraft have both interior and exterior lighting systems, with each having various different types of lights for providing one or more functions. At least some aircraft lights include one or more sensors, as well as a health monitoring circuit that is dedicated to monitoring the health of the corresponding aircraft light. Not all aircraft lights include such one or more sensors. During even shorter flights, these individual health monitoring circuits for aircraft lighting may consume a considerable amount of power. Irrespective of the power rating of a given aircraft lighting unit, criticality of operation of a given aircraft lighting unit, a number of sensors used by a given aircraft lighting unit, an amount of data to be sensed in relation to a given aircraft lighting unit, and the frequency of data sensing for a given aircraft lighting unit, the health monitoring circuit(s) for the given aircraft lighting unit will consume the same amount of power. Cumulatively, there will be significant power consumption for the health monitoring of the entire aircraft lighting system. In addition, not all aircraft lighting units utilize a corresponding health monitoring feature due, for instance, to space constraints, increase in product cost of the aircraft lighting unit, and the like.

SUMMARY

An aircraft lighting health monitoring system is presented herein. Both the configuration of such an aircraft lighting health monitoring system and the operational characteristics of such an aircraft lighting health monitoring system are within the scope of this Summary.

The aircraft lighting health monitoring system may include a controller and a health monitoring module. This controller may be configured to receive sensor data from each of a plurality of aircraft lights. The health monitoring module is configured to assess received sensor data from each of a plurality of aircraft lights. The health monitoring module is further configured to issue a health status communication in at least certain instances regarding a particular aircraft light and based upon an assessment of its corresponding sensor data. The aircraft lighting health monitoring system may be positioned/incorporated at any appropriate location. For instance, the controller and health monitoring module could be a stand-alone unit, or the controller and health monitoring module could in fact be incorporated by a particular aircraft light or a power supply (e.g., box) for an aircraft light.

The aircraft lighting health monitoring system may use both a CPU and a DMA controller, and furthermore may be configured to classify sensor data received from the various aircraft lights. This classification may be utilized to determine whether the CPU or the DMA controller should be utilized with regard to particular sensor data. The CPU may be maintained in a sleep mode until needed to assess sensor data of a first data classification, at which time the CPU is activated for the assessment and also outputs an appropriate health status communication to one or more displays. The DMA controller of the aircraft lighting health monitoring system may be used to handle sensor data of a second data classification (e.g., to control storage of such sensor data).

Various aspects of the present disclosure are also addressed by the following paragraphs and in the noted combinations:

1. An aircraft lighting health monitoring system, comprising:
   a controller configured to receive sensor data from each of a plurality of aircraft lights; and
   a health monitoring module configured to assess received sensor data from each of the plurality of aircraft lights, and further configured to issue a health status communication regarding at least one aircraft light based upon an assessment of its corresponding received sensor data.

2. The aircraft lighting health monitoring system of paragraph 1, wherein said health monitoring module comprises a health monitoring circuit.

3. The aircraft lighting health monitoring system of any of paragraphs 1-2, wherein said controller comprises a central processing unit (CPU) and a separate direct memory access (DMA) controller.

4. The aircraft lighting health monitoring system of paragraph 3, wherein said aircraft lighting health monitoring system is configured to use one of said CPU or said DMA controller based upon a classification of the received sensor data.

5. The aircraft lighting health monitoring system of any of paragraphs 3-4, wherein said aircraft lighting health monitoring system is configured to dispose said CPU out of a sleep mode when the received sensor data is of a first data classification, to use said CPU to assess this received sensor data, and to output said health status communication pertaining to this received sensor data and the corresponding aircraft light.

6. The aircraft lighting health monitoring system of paragraph 5, further comprising:
   a display, wherein said health status communication is transmitted to and presented on said display.

7. The aircraft lighting health monitoring system of any of paragraphs 3-6, wherein said aircraft lighting health monitoring system is configured to use said DMA controller when the received sensor data is of a second data classification, wherein said first data classification is different from said second data classification.

8. The aircraft lighting health monitoring system of paragraph 7, wherein said aircraft lighting health monitoring system is configured to maintain said CPU in a sleep mode when the received sensor data is of said second data classification.

9. The aircraft lighting health monitoring system of any of paragraphs 7-8, further comprising:
   data storage, wherein said aircraft lighting health monitoring system is configured to use said DMA controller to transfer the received sensor data, of said second data classification, to said data storage.

10. An aircraft, comprising:
    an aircraft lighting health monitoring module;

a first aircraft light operatively interconnected said with health monitoring module; and a second aircraft light operatively interconnected with said health monitoring module.

11. The aircraft of paragraph 10, wherein each of said first aircraft light and said second aircraft light comprise a sensor and a sensor data transmitter.

12. The aircraft of any of paragraphs 10-11, wherein each of said first aircraft light and said second aircraft light are operatively interconnected with said health monitoring module by a communication link selected from the group consisting of a wired communication link and a wireless communication link.

13. The aircraft of any of paragraphs 10-12, wherein said health monitoring module comprises a health monitoring circuit.

14. The aircraft of any of paragraphs 10-13, wherein said health monitoring module comprises a controller, which in turn comprises a central processing unit (CPU) and a separate direct memory access (DMA) controller.

15. The aircraft of paragraph 14, wherein said health monitoring module is configured to use one of said CPU or said DMA controller based upon a classification of sensor data transmitted from either of said first aircraft flight and said second aircraft light to said health monitoring module.

16. The aircraft of paragraph 14, wherein said health monitoring is configured to dispose said CPU out of a sleep mode when said sensor data received by said health monitoring module is of a first data classification, to use said CPU to assess said sensor data, and to output a health status communication pertaining to said sensor data and a corresponding aircraft light.

17. The aircraft of paragraph 14, further comprising: a display, wherein said health status communication is transmitted to and presented on said display.

18. The aircraft of any of paragraphs 15-17, wherein said health monitoring module is configured to use said DMA controller when said sensor data received by said health monitoring module is of a second data classification.

19. The aircraft of paragraph 18, wherein said health monitoring module is configured to maintain said CPU in a sleep mode when said sensor data received by said aircraft lighting health monitoring system is of said second data classification.

20. The aircraft of any of paragraphs 18-19, further comprising:
data storage, wherein said health monitoring module is configured to use said DMA controller to transfer said sensor data, received by said health monitoring module, to said data storage.

21. A method of monitoring an aircraft lighting system, comprising:
monitoring a first aircraft light;
transmitting data from said monitoring of said first aircraft light to a health monitoring module of an aircraft lighting health monitoring system;
monitoring a second aircraft light; and
transmitting data from said monitoring of second first aircraft light to said health monitoring module.

22. The method of paragraph 21, wherein said monitoring a first aircraft light comprises using a first sensor, wherein said first aircraft light comprises said first sensor.

23. The method of any of paragraphs 21-22, wherein said transmitting for said first aircraft light comprises using a communication link selected from the group consisting of a wired communication link and a wireless communication link.

24. The method of any of paragraphs 21-23, wherein said monitoring a second aircraft light comprises using a second sensor, wherein said second aircraft light comprises said second sensor.

25. The method of any of paragraphs 21-24, wherein said transmitting for said second aircraft light comprises using a communication link selected from the group consisting of a wired communication link and a wireless communication link.

26. The method of any of paragraphs 21-25, wherein said health monitoring module comprises a health monitoring circuit.

27. The method of any of paragraphs 21-26, further comprising:
determining a classification of said data received by said health monitoring module, wherein said determining comprises determining if said data is one of a first data classification or a second data classification.

28. The method of paragraph 27, wherein said health monitoring module comprises a controller, which in turn comprises a central processing unit (CPU) and a separate direct memory access (DMA) controller.

29. The method of paragraph 28, further comprising:
using one of said CPU or said DMA controller based upon said determining.

30. The method of paragraph 29, further comprising:
disposing said CPU out of a sleep mode when said data is of said first data classification from said determining;
using said CPU to assess said data of said first data classification; and
outputting a health status communication pertaining to said data and a corresponding aircraft light.

31. The method of paragraph 30, further comprising:
transmitting said health status communication to and presenting said health status communication on a display.

32. The method of any of paragraphs 27-31, further comprising:
using said DMA controller when said data is of said second data classification from said determining.

33. The method of paragraph 32, further comprising:
maintaining said CPU in a sleep mode when said data is of said second data classification from said determining.

34. The method of any of paragraphs 32-3, further comprising:
using said DMA controller to transfer said data, received by said health monitoring module, to data storage.

DETAILED DESCRIPTION

Figure 1:
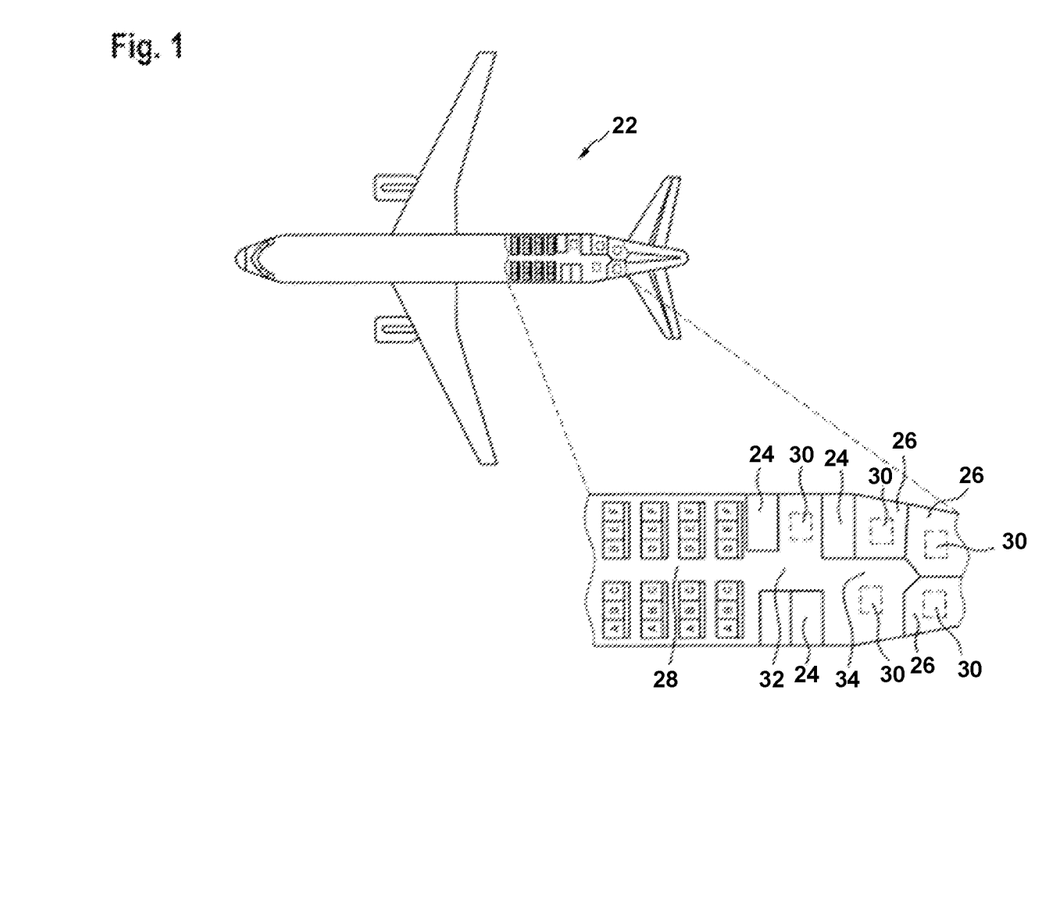
FIG. 1 shows an aircraft, the aircraft being shown in a top view and being shown as partially cut open for illustrating a portion of the interior of the aircraft, which is equipped with a plurality of aircraft cabin lighting arrangements, in various embodiments.

FIG. 1 shows an aircraft 22 in accordance with various embodiments. While the aircraft 22, which is a large commercial passenger airplane, is shown in a top view, a rear portion of the aircraft 22 is depicted in a cut-open manner, in order to view the interior of the aircraft 22. In the cut-open portion, a rear end of the seating portion 28 of the aircraft is depicted. In particular, the last four seating rows of the seating portion 28 of the aircraft 22 are shown. In general, the seats of the aircraft 22 and the aisle(s) between the seats are considered the seating portion 28 of the aircraft 22.

Behind the seating portion 28, there are provided three galleys 24 and three washrooms 26. The space in between the galleys 24 is considered the galley area 32. This galley area 32 is predominantly used by the crew members for preparing passenger service, such as food and beverage service, as well as for cleaning up and discarding trash. The space in between the galleys 24 and the washrooms 26 is considered the wash room waiting area 34. This space is predominantly used by passengers when waiting for a washroom 26 or when stretching during long flights. It is possible that the wash room waiting area 34 is also used by the crew members for their various on-board tasks.

The galley area 32, the wash room waiting area 34, and the washrooms 26 are examples of common spaces of an aircraft. The term "common space of an aircraft" refers to a space that is jointly used by various passengers and/or crew members, without being intermediately linked to the seating space. Thus, the aisle(s) may not be considered a common space in the context of the present document. It is a characteristic of the common space of the aircraft that it may be occupied/used by persons at times during the flight, while being void of any persons at other times.

In the cut-open portion of the exemplary aircraft 22 of FIG. 1, there are provided five aircraft cabin lighting arrangements 30 in accordance with various embodiments. One aircraft cabin lighting arrangement 30 is arranged in the galley area 32, one aircraft cabin lighting arrangement 30 is arranged in the wash room waiting area 34, and three aircraft cabin lighting arrangements 30 are arranged in the three washrooms 26. Each aircraft cabin lighting arrangement 30 is provided for illuminating a portion of the common space of the aircraft 22. It is pointed out that the arrangement of the aircraft cabin lighting arrangements 30 is exemplary only and that other arrangements are possible as well. For example, aircraft cabin lighting arrangements in accordance with various embodiments may only be present in a part of the common spaces of the aircraft 22, while another part of the common spaces of the aircraft 22 may be illuminated with other aircraft cabin lights. Also, it is possible to provide a single aircraft cabin lighting arrangement 30 for illuminating various common spaces of the aircraft 22, such as a single aircraft cabin lighting arrangement 30 for illuminating both the galley area 32 and the wash room waiting area 34.

The aircraft cabin lighting arrangements 30 of the exemplary embodiment of FIG. 1 are provided in respective ceiling portions of the aircraft cabin and are therefore depicted in dotted lines in FIG. 1. It is pointed out, however, that one or some or all of the aircraft cabin lighting arrangements 30 may also be arranged in respective wall portions of the aircraft cabin or the wash rooms.

Figure 2:
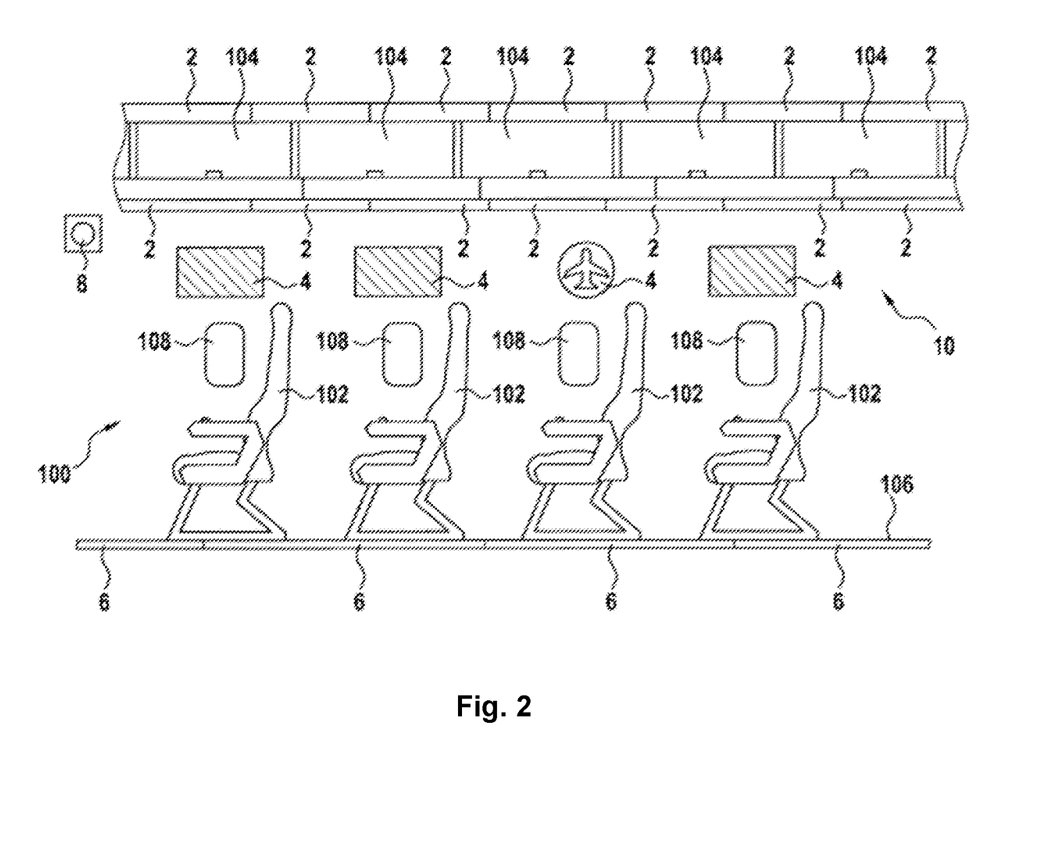
FIG. 2 shows a side view section of an aircraft cabin, equipped with a cabin lighting system, in various embodiments.

FIG. 2 shows a section of an aircraft cabin 100, the aircraft cabin 100 being equipped with a lighting system 10 in accordance with various embodiments. The aircraft cabin 100 has those structures/elements that are commonly encountered in an aircraft cabin of a large passenger aircraft. For illustrative purposes, a plurality of passenger seats 102 are depicted. The passenger seats 102 are shown to be arranged on a floor 106 of the aircraft cabin 100. Each of the passenger seats 102 is depicted next to a window 108, which allows the passengers to view the outside of the aircraft. Further, a plurality of overhead baggage compartments 104 are shown, which provide storage space to the passengers.

The lighting system 10 has a plurality of light units 2. In the exemplary embodiment of FIG. 2, two kinds of light units 2 are shown. On the one hand, a plurality of light units 2 are arranged underneath the overhead baggage compartments 104, in particular arranged at the side wall of the aircraft cabin 100 and mounted at least partially between the side wall of the aircraft cabin 100 and the overhead baggage compartments 104. On the other hand, a plurality of light units 2 are arranged on top of the overhead baggage compartments 104, in particular at least partially arranged between the overhead baggage compartments 104 and the ceiling of the aircraft cabin 100. The former kind of light units may be referred to as wall light units, while the latter kind of light units may be referred to as ceiling light units.

The light units 2 have a longitudinal extension along the aircraft cabin 100. In other words, their extension along the length of the aircraft cabin 100 is much greater than their extension in the width-wise and the height-wise dimension of the aircraft cabin 100. In the particular embodiment of FIG. 2, the light units have a length-wise dimension of about 50 cm.

Each of the light units 2 may include a plurality of visible light LEDs, at least one UV LED, and at least one infrared LED. In such a case, each of the light units 2 would be able to emit visible light, UV light, and infrared light. Further in particular, each of the plurality of light units 2 is individually controllable with respect to these different kinds of light output. It is possible for any given light unit 2 to emit one of or any subset of visible light, UV light, and infrared light at any point in time. In other words, each of the visible light emission functionality, the UV light emission functionality, and the infrared light emission functionality may be individually switched on and off for each of the plurality of light units 2. It is, however, pointed out that it is also possible that each of the light units 2 may have infrared lighting functionality only or infrared and visible lighting functionality only.

The exemplary lighting system 10 of FIG. 2 may further include a plurality of indirect illumination regions 4. The indirect illumination regions 4 have photo luminescent paint applied to the side wall of the aircraft cabin 100. In the exemplary embodiment of FIG. 2, the indirect illumination regions 4 have fluorescent paint applied to the side wall of the aircraft cabin. The fluorescent paint emits visible light pursuant to being charged by UV light. The fluorescent paint further has a very fast reaction time, starting and stopping the emission of visible light very shortly after receiving UV light/no longer receiving UV light. For three out of the four depicted indirect illumination regions 4, the photo luminescent paint is applied in a continuous manner across the indirect illumination regions 4, thus forming a continuous source of indirect illumination across the respective indirect illumination regions. The fourth indirect illumination region 4 has photo luminescent paint applied to the side wall of the aircraft cabin 100 in a discontinuous manner. In particular, the photo luminescent paint is applied in a patterned manner, with the pattern representing an airline logo in the exemplary embodiment of FIG. 2. It is apparent that the plurality of indirect illumination regions may thus form sources of uniform indirect illumination or may have any kind of pattern, such as a geometric pattern, a symbol, etc.

The lighting system 10 may further include a plurality of emergency path markings 6, disposed along the floor 106 of the aircraft cabin 100. The emergency path markings 6 are also photo luminescent. In the particular embodiment of FIG. 2, the emergency path markings 6 are phosphorescent. The phosphorescent emergency path markings allow for being charged with UV light and/or visible light and for emitting visible light over an extended period of time, after the charging has been discontinued. The emergency path markings 6 of the exemplary embodiment of FIG. 2 are charged much more rapidly by UV light than by visible light.

Figure 3:
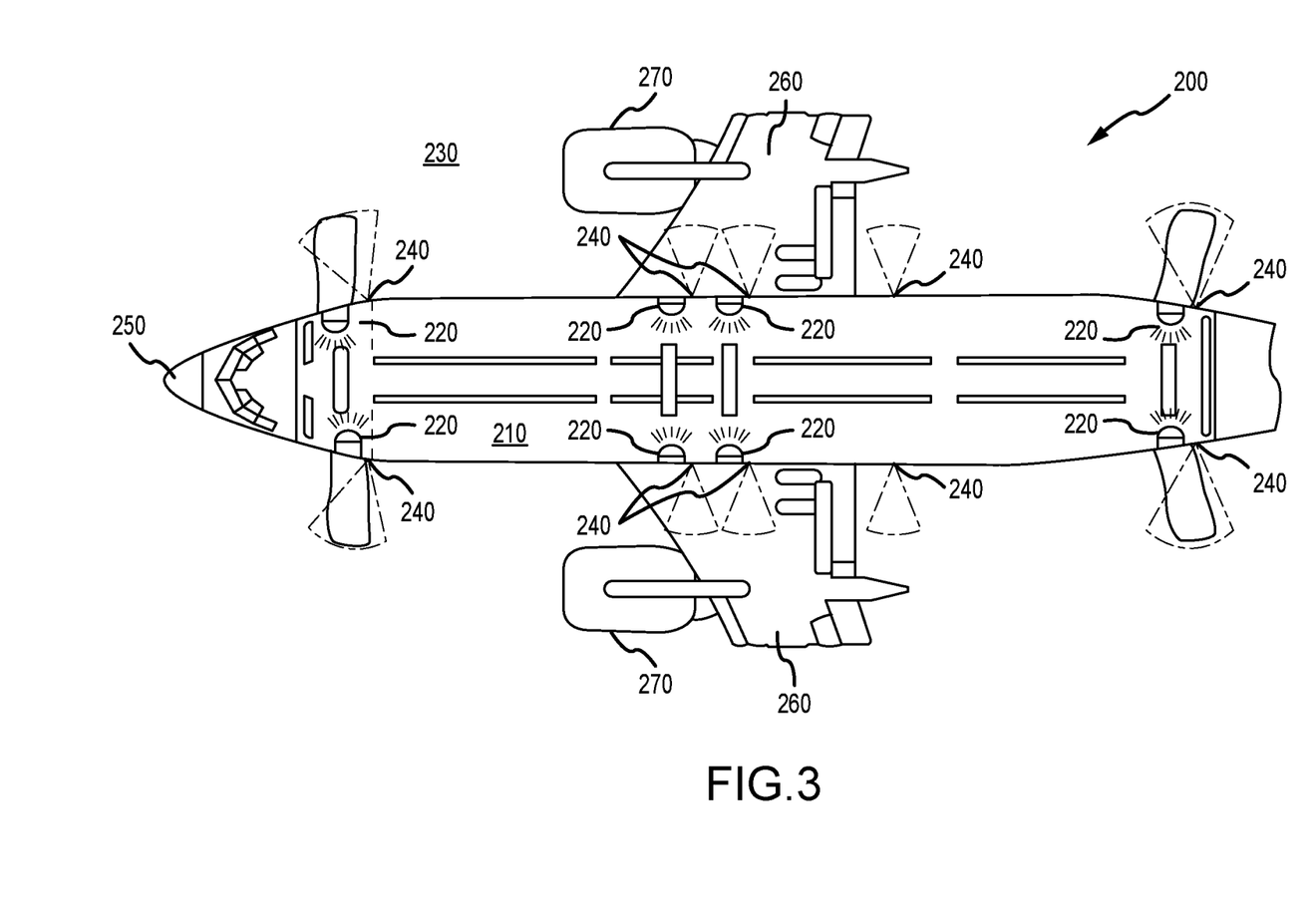
FIG. 3 is a schematic of an aircraft having an aircraft emergency lighting system, in various embodiments.

FIG. 3 illustrates an aircraft 200 in accordance with various embodiments. The aircraft 200 includes an interior 210, an exterior 230, a forward end 250, a pair of wings 260, and a plurality of engines 270. A plurality of interior emergency lights 220 are disposed throughout the interior 210 of the aircraft 200, for instance at the various exits from the aircraft 200 (e.g., on each side at a forward location of the aircraft 200; on each side at a rearward location of the aircraft 200; on each side of the aircraft 200 over its corresponding wings 260). A plurality of exterior emergency lights 240 are disposed at various locations on an exterior 230 of the aircraft 200, for instance at the various exits from the aircraft 200 (e.g., on each side at a forward location of the aircraft 200; on each side at a rearward location of the aircraft 200; on each side of the aircraft 200 over its corresponding wings 260). Each of the interior emergency lights 220 and each of the exterior emergency lights 240 may be of any appropriate type and/or configuration.

Figure 4A:
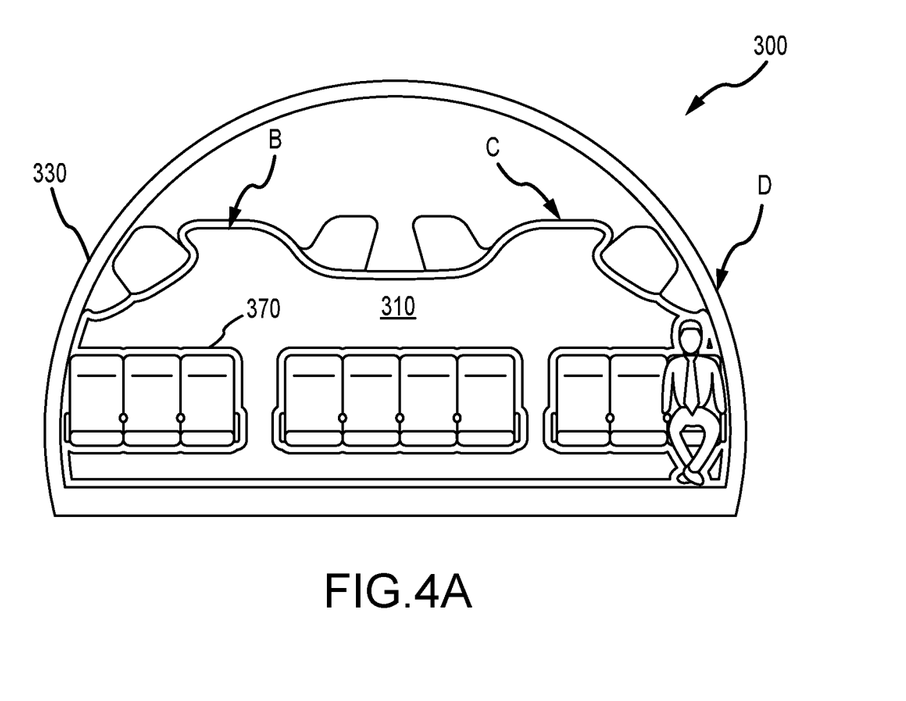
FIG. 4A is a cutaway schematic of an aircraft having an emergency lighting system and a cabin lighting system, in various embodiments.
Figure 4B:
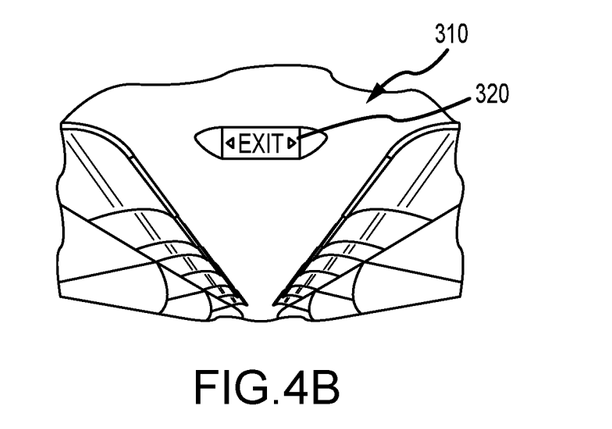
FIG. 4B is a representative interior emergency light for an aircraft emergency lighting system, in various embodiments.
Figure 4C:
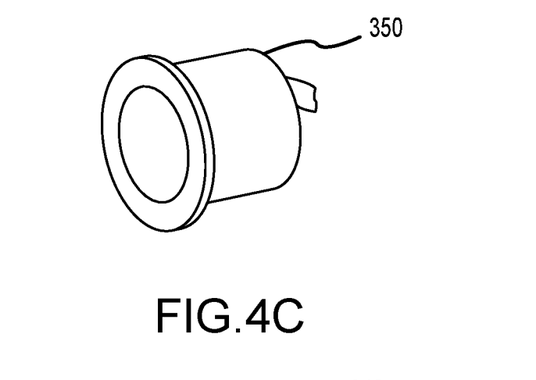
FIG. 4C is a representative cabin light for an aircraft cabin lighting system, in various embodiments.
Figure 4D:
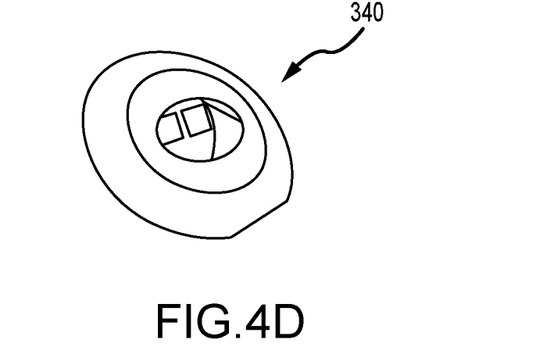
FIG. 4D is a representative exterior emergency light for an aircraft emergency lighting system, in various embodiments.

FIG. 4A illustrates an aircraft 300 in accordance with various embodiments. The aircraft 300 includes an interior 310 and an exterior 330. The interior 310 includes a plurality of seats 370 which may be disposed in any appropriate number of rows. Each row may include one more row sections. Arrow B indicates a representative location for an interior emergency light (e.g., emergency light 320 shown in FIG. 4B). Arrow C indicates a representative location for an interior cabin light (e.g., cabin light 350 shown in FIG. 4C). Arrow D indicates a representative location for an exterior emergency light (e.g., exterior emergency light 340 shown in FIG. 4D). A plurality of interior emergency lights may be disposed throughout the interior 310 of the aircraft 300 and in any appropriate arrangement, for instance at the various exits from the aircraft 300 (e.g., on each side at a forward location of the aircraft 300; on each side at a rearward location of the aircraft 300; on each side of the aircraft 300 over its corresponding wings). A plurality of exterior emergency lights may be disposed at various locations on an exterior 330 of the aircraft 300 and in any appropriate arrangement, for instance at the various exits from the aircraft 300 (e.g., on each side at a forward location of the aircraft 300; on each side at a rearward location of the aircraft 300; on each side of the aircraft 300 over its corresponding wings). Each of the interior emergency lights and each of the exterior emergency lights may be of any appropriate type and/or configuration.

Figure 5:
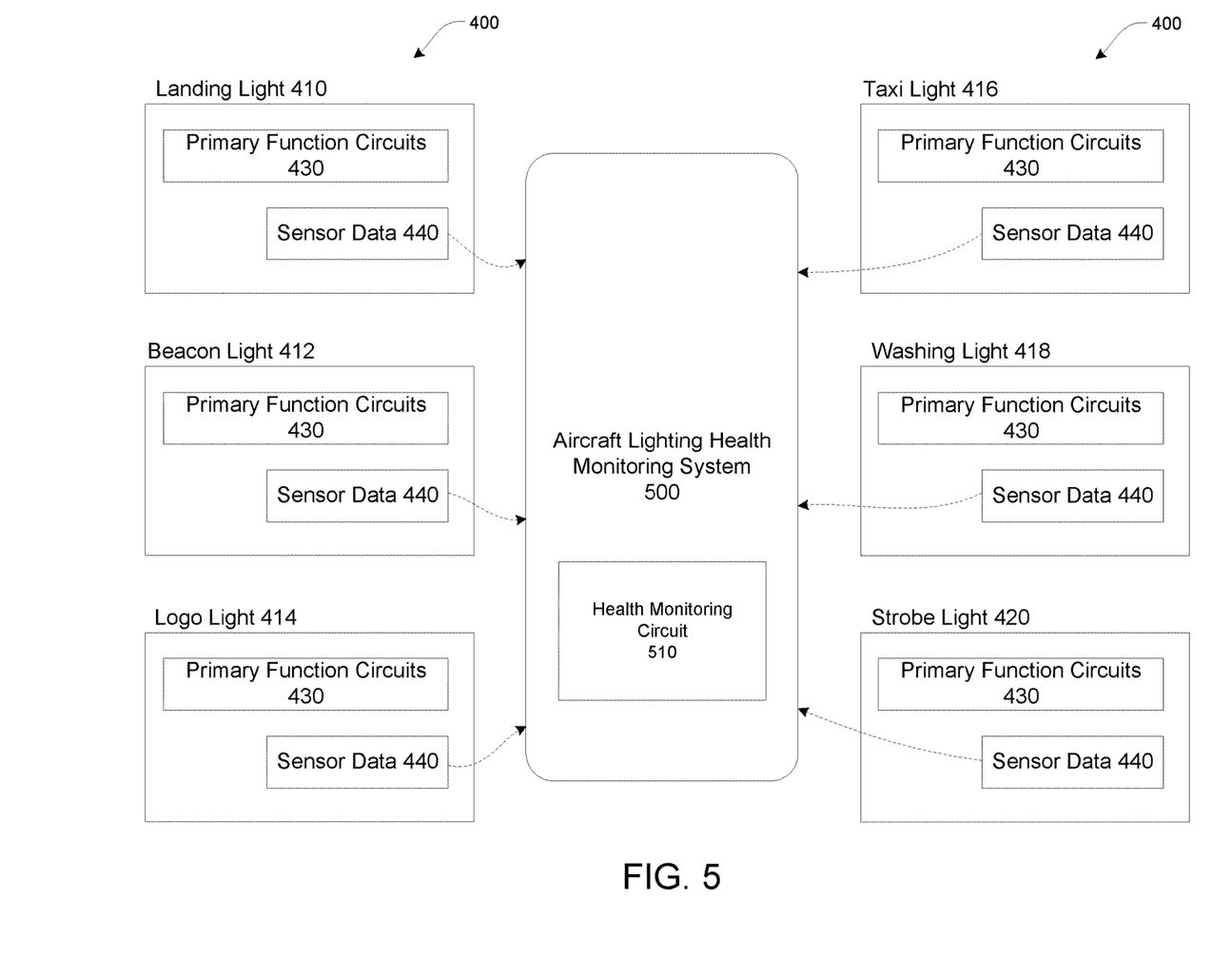
FIG. 5 is a schematic of an aircraft lighting health monitoring system, in various embodiments.

An aircraft lighting health monitoring system is disclosed in FIG. 5 and is identified by reference numeral 500. A representative aircraft lighting system is also disclosed in FIG. 5 and is identified by reference numeral 400. Generally, the aircraft lighting health monitoring system 500 is centralized in relation to the various lights of the aircraft lighting system 400 in that the health of one or lights of the aircraft lighting system 400 (and including each light of the aircraft lighting system 400) may be monitored using a common health monitoring circuit 510 of the aircraft lighting health monitoring system 500. Typically the aircraft lighting health monitoring system 500 will be remotely located relative to one or more aircraft lights that are operatively interconnected with the system 500, including being remotely located relative to each aircraft light that is operatively interconnected with the system 500.

The representative lights for the aircraft lighting system shown in FIG. 5 includes a landing light 410 (exterior), a beacon light 412 (exterior), a logo light 414 (interior), a taxi light 416 (exterior), a washing light 418 (interior), and a strobe light 420 (exterior). Each light 410-420 includes one or more primary function circuits 430. The primary function circuit(s) 430 may be of any appropriate configuration in relation to each light 410-420 (e.g., a given primary function circuit(s) may be specific to its corresponding aircraft light (or its corresponding aircraft light type)). Sensor data 440 is acquired for each light 410, and may be transmitted to the aircraft lighting health monitoring system 500 in any appropriate manner (using any appropriate communication link, such as a wired communication link or a wireless communication link).

Figure 6:
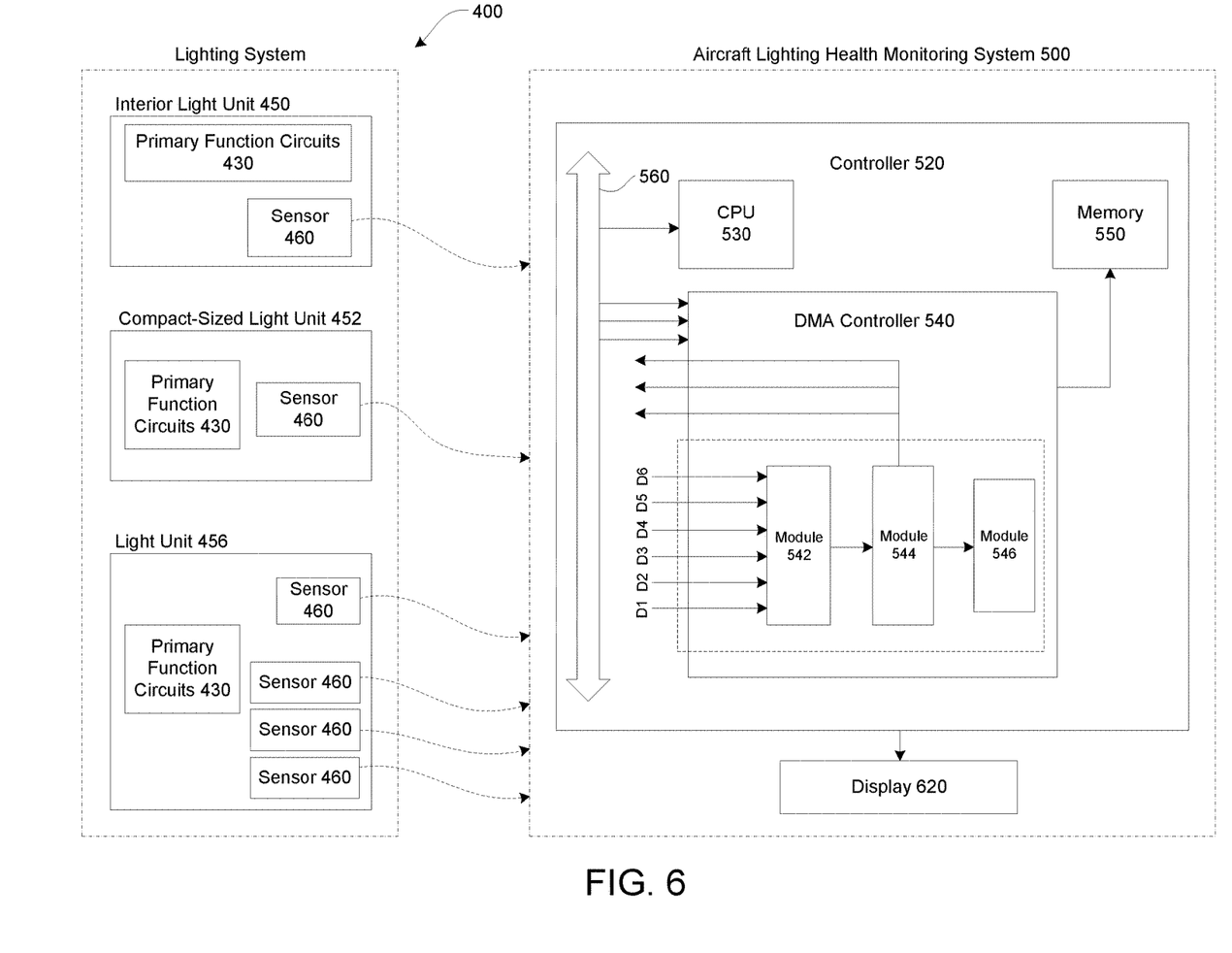
FIG. 6 is another schematic of a representative configuration of an aircraft lighting health monitoring system shown in FIG. 5, in various embodiments.

Additional details regarding the aircraft lighting health monitoring system 500 are presented in FIG. 6. The aircraft lighting health monitoring system 500 includes a controller 520 (e.g., a health monitoring module) that is operatively interconnected with one or more displays 620. Each display 620 may be disposed at any appropriate location within the aircraft, may be disposed at one or more ground stations, or both.

The controller 520 of the aircraft lighting health monitoring system 500 may include a central processing unit or CPU 530, a direct memory access or DMA controller 540, and a system bus 560. The controller 520 may further include a signal conditioning module 542, a data processing module 544 (e.g., the health monitoring circuit 510 shown in FIG. 5), and a data storage module 546 (e.g., a computer-readable storage medium). The aircraft lighting health monitoring system 500 may also include suitable memory 550 of any appropriate type and utilizing any appropriate data storage architecture (e.g., a computer-readable storage medium).

Additional representative lights of the aircraft lighting system 400 are also presented in FIG. 6, including an interior light unit 450, a compact-sized light unit 452, and a light unit 456. Each light 450-456 again includes one or more primary function circuits 430 and at least one sensor 460 (e.g., for acquiring the sensor data 440 on the corresponding light, and which again is transmitted in any appropriate manner to the aircraft lighting health monitoring system 500).

Figure 6A:
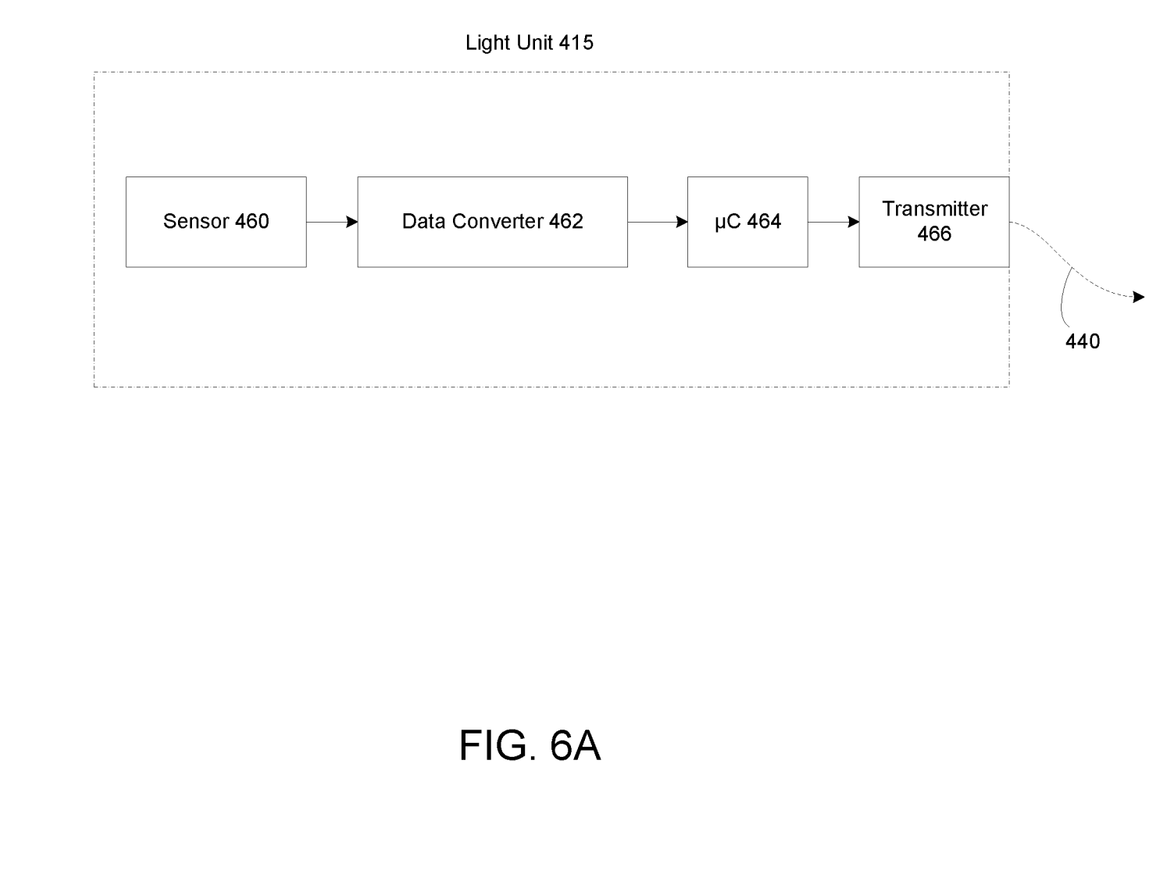
FIG. 6A is a functional schematic of a sensor used by the aircraft lighting health monitoring system shown in FIGS. 5-6, in various embodiments.

FIG. 6A shows a representative configuration of an aircraft light unit 415 (e.g., lights 410, 412, 414, 416, 418, 420, 450, 452, 456) that may be used in conjunction with the aircraft lighting health monitoring system 500. The light unit 415 includes a sensor 460, an optional data converter 462, a microcontroller 464, and a transmitter 466. The sensor 460 may be of any appropriate size, shape, configuration, and/or type. Depending upon one or more characteristics of the sensor 460, the data converter 462 may not be required for a given light unit 415. A representative data converter 462 is the form of an analog-to-digital converter. The transmitter 466 may be of any appropriate type for purposes of outputting/transmitting sensor data 440 to the aircraft lighting health monitoring system 500 via an appropriate communication port of the aircraft light 415. A given sensor 460 itself may incorporate one or more of the data converter 462, microcontroller 464, and transmitter 466.

Figure 7:
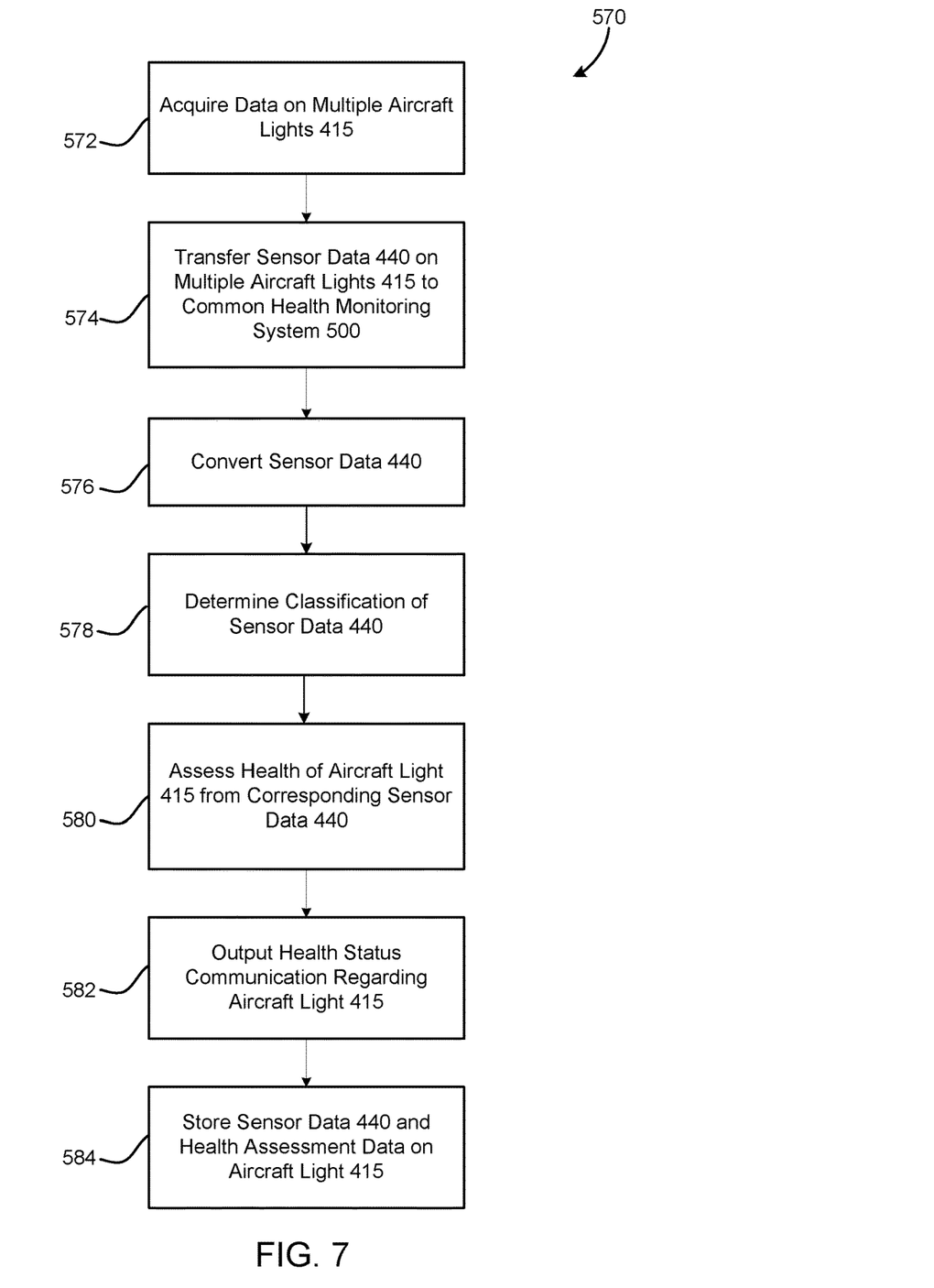
FIG. 7 is a protocol that may be used by an aircraft lighting health monitoring system, in various embodiments.

An aircraft lighting health monitoring protocol that may be used by the aircraft lighting health monitoring system 500 is illustrated in FIG. 7 and is identified by reference numeral 570. Sensor data 440 is acquired on multiple aircraft lights 415 (step 572). This sensor data 440 from multiple aircraft lights 415 is transmitted to a common health monitoring system 500 (step 574). The sensor data 440 may be converted (step 576), either by the sensor 460 or by the system 500.

Sensor data that is received by the system 500 is classified as being of one of multiple data classifications (step 578). The health of the associated aircraft light 415 may be assessed from its corresponding sensor data 440 (step 580). A health assessment or status communication regarding a particular aircraft light 415 may be output (step 582), for instance to one or more displays 620 used by/available to the aircraft lighting health monitoring system 500 (FIG. 6). Both the sensor data 440 and the health assessment data on the corresponding aircraft light 415 may be stored, for instance in memory 550 (step 584).

In the case where the sensor data 440 being assessed pursuant to step 578 is determined to be of a first data classification or to be a Data Classification 1, the protocol 570 may be configured to dispose the CPU 530 out of a sleep mode (e.g., the CPU 530 may be disposed in a sleep mode until needed by the controller 520). The CPU 530 may then be used to assess the health of the aircraft light 415 from the corresponding sensor data 440 (step 580), and may output an appropriate health status communication regarding the aircraft light 415 (including regarding individual components of the aircraft light 415).

In the case where the sensor data 440 being assessed pursuant to step 578 is determined to be of a second data classification or to be of a Data Classification 2, the CPU 530 may be maintained in a sleep mode, the protocol 570 may be configured such that the DMA controller 540 is used to store the sensor data 440 (step 584) and including without assessing the health of the corresponding aircraft light 415 at that time, or both. This sensor data 440 could instead be assessed at a later time/date by the aircraft lighting health monitoring system 500 (e.g., after completion of a flight of the corresponding aircraft).

Figure 8:
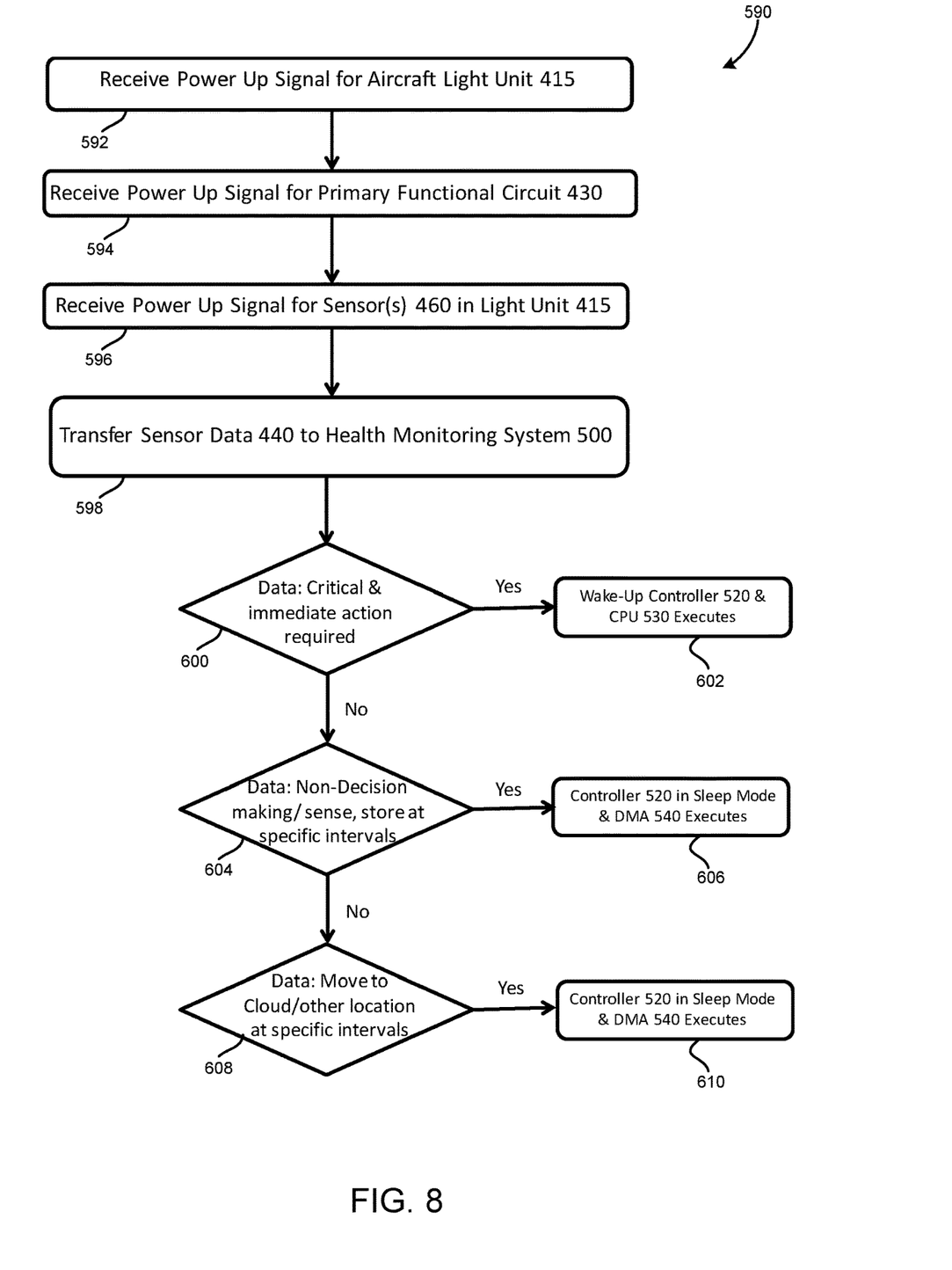
FIG. 8 is an additional protocol that may be used by aircraft lighting health monitoring system, in various embodiments.

Another aircraft lighting health monitoring protocol that may be used by the aircraft lighting health monitoring system 500 is illustrated in FIG. 8 and is identified by reference numeral 590. The system 500 may receive a signal/communication that an aircraft light unit 415 has been powered up or activated (step 592), a signal/communication that the primary function circuit 430 of an aircraft light unit 415 has been powered up or activated (step 594), and a signal/communication that the sensor(s) 460 of an aircraft light unit 415 has been powered up or activated (step 596), and which may be executed in any order.

Sensor data 440 is transmitted by a sensor 460 and is received by the health monitoring system 500 (step 598). The protocol 590 may be configured to determine the classification of the sensor data 440. Representative categories for sensor data 440 include: Data Classification 1 (e.g., sensor data 440 which is used for making a decision and taking prompt (e.g., immediate) action); and Data Classification 2 (e.g., sensor data 440 that does not require the taking of a prompt action—all sensor data 440 that is not of Data Classification 1). Sensor data 444 Data Classification 2 could be further classified into one or more additional classifications.

The aircraft lighting health monitoring system 500 may be configured such that the signal conditioning module 542 receives the sensor data 440 through an appropriate communication port (e.g., D1-D6), for instance to provide any desired/required data conversion. The data processing module 544 (in conjunction with the memory 550) may be used to determine whether the sensor data 540 is Data Classification 1 or Data Classification 2.

In the event that the protocol 590 (e.g., data processing module 544, which may use the memory 550) determines that the sensor data 440 is of Data Classification 1, the protocol 590 proceeds from step 600 to step 602. At step 602, the CPU 530 of the aircraft lighting health monitoring system 500 is disposed in an active mode (e.g., taken out of a sleep mode; receives a "wake up" command), and the CPU 530 is utilized to assess the sensor data 440 and to take appropriate responsive action based upon the sensor data 440, for instance to send a signal/communication to one or more displays 620 of the aircraft to convey the result of the assessment of the sensor data 440 and/or a current health condition/status relating to the aircraft light 415 (e.g., activation of a warning light, provision of a textual warning, provision of an audio warning, or the like). For instance, step 602 of the protocol 590 may issue a signal/communication that the corresponding aircraft light 415, including one or more of its components, are not functioning, is compromised in at some respect, a command (e.g., to turn off a corresponding aircraft light 415, for instance due to overheating, over voltage, over current, or the like), a warning/indication (e.g., that a warranty 415 of a corresponding aircraft light 415 is about to expire), or the like.

In the event that the protocol 590 (e.g., the data processing module 544, which may use the memory 550) determines that the sensor data 440 is of Data Classification 2 and is of a type that is to be stored at specified intervals, the protocol 590 proceeds from step 600 to step 604. At step 604, the CPU 530 is maintained in a sleep mode and the DMA controller 540 may be used to store the sensor data 440 in the data storage module 546. Otherwise, the protocol 590 instead proceeds from step 604 to steps 608 and 610 where the CPU 530 is maintained in a sleep mode and the DMA controller 540 may be used to store the sensor data 440 in the data storage module 546, and furthermore where the DMA controller 540 is configured to transmit sensor data 440 from the data storage module 546 on a specified basis to a location outside of the aircraft lighting health monitoring system 500 (e.g. to other data storage, for instance data storage "off board" relative to the aircraft).

The aircraft lighting health monitoring system 500 may be installed/incorporated at any appropriate location. For instance, the controller 520 for the aircraft lighting health monitoring system 500 could be a stand-alone unit (e.g., separate from all associated aircraft lights 415), the controller 500 could be incorporated by a particular aircraft light 415, or the controller 500 could be incorporated by a power supply (e.g., box) for an aircraft light 415. Compared to having a dedicated health monitoring system for individual aircraft light units, the aircraft lighting health monitoring system 500 should realize significant energy savings (e.g., the current consumption by the controller 520 in many instances may be reduced from the range of mA into nA). The aircraft lighting health monitoring system 500 also eliminates redundant health monitoring circuit blocks/parts for the aircraft lighting system, as the same health monitoring circuit 510 may be used by multiple aircraft lights 415 (versus individual aircraft lights having dedicated health monitoring functionality). As the aircraft lighting health monitoring system 500 may be used by multiple aircraft lights 415, it can be extended to additional aircraft lights 415 (e.g., low cost interior light units as well) without a corresponding cost increase. As the aircraft lighting health monitoring system 500 may be in the form of a stand-alone unit or may be incorporated by larger aircraft lights 415, it removes space constraint issues for use with smaller-sized aircraft lights 415, as a given aircraft light 415 need not itself incorporate the aircraft lighting health monitoring system 500.

Any feature of any other various aspects addressed in this disclosure that is intended to be limited to a "singular" context or the like will be clearly set forth herein by terms such as "only," "single," "limited to," or the like. Merely introducing a feature in accordance with commonly accepted antecedent basis practice does not limit the corresponding feature to the singular. Moreover, any failure to use phrases such as "at least one" also does not limit the corresponding feature to the singular. Use of the phrase "at least generally" or the like in relation to a particular feature encompasses the corresponding characteristic and insubstantial variations thereof (e.g., indicating that a surface is at least substantially or generally flat encompasses the surface actually being flat and insubstantial variations thereof). Finally, a reference of a feature in conjunction with the phrase "in one embodiment" does not limit the use of the feature to a single embodiment.

The foregoing description has been presented for purposes of illustration and description. Furthermore, the description is not intended to limit the invention to the form disclosed herein. Consequently, variations and modifications commensurate with the above teachings, and skill and knowledge of the relevant art, are within the scope of the present disclosure. Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. Finally, it should be understood that any of the above described concepts can be used alone or in combination with any or all of the other above described concepts. Although various embodiments have been disclosed and described, one of ordinary skill in this art would recognize that certain modifications would come within the scope of this disclosure. Accordingly, the description is not intended to be exhaustive or to limit the principles described or illustrated herein to any precise form. Many modifications and variations are possible in light of the above teaching.

What is claimed is:

1. An aircraft lighting health monitoring system, comprising:
   a display;
   a data storage module;
   a controller configured to receive sensor data from each of a plurality of aircraft lights wherein the controller comprises a central processing unit (CPU);
   a separate direct memory access (DMA) controller; and
   a health monitoring module configured to assess received sensor data from each of the plurality of aircraft lights, and further configured to issue a health status communication regarding at least one aircraft light,
wherein said CPU is configured to be disposed of in at least one of an active mode or a sleep mode,
wherein said aircraft lighting health monitoring system is configured to dispose said CPU from said sleep mode in response to the received sensor data being of a first data classification,
wherein said CPU assesses said received sensor data of said first data classification and outputs said health status communication to said display in response to being disposed from said sleep mode,
wherein said aircraft lighting health monitoring system is configured to maintain said CPU in said sleep mode and to use said DMA controller in response to said received sensor data being of a second data classification to transfer said received sensor data of said second data classification to said data storage for a post-flight assessment, and
wherein said first data classification is different from said second data classification.

2. The aircraft lighting health monitoring system of claim 1, wherein said health status communication output by said CPU pertains pertaining to the received sensor data of said first data classification and the corresponding aircraft light.

3. An aircraft, comprising:
a display:
a data storage module;
a health monitoring module;
a first aircraft light operatively interconnected with said health monitoring module;
a second aircraft light operatively interconnected with said health monitoring module;
a controller, which comprises a central processing unit (CPU) configured to be disposed of in at least one of an active mode or a sleep mode; and
a separate direct memory access (DMA) controller,
wherein said health monitoring module is configured to dispose said CPU from said sleep mode in response to sensor data transmitted from either of said first aircraft light and said second aircraft light to said health monitoring module being of a first data classification,
wherein said CPU assesses said sensor data of said first data classification and outputs a health status communication to said display in response to being disposed from said sleep mode, and wherein said aircraft lighting health monitoring system is configured to maintain said CPU in said sleep mode and to use said DMA controller in response to sensor data transmitted from either of said first aircraft light and said second aircraft light to said health monitoring module being of a second data classification to transfer said sensor data of said second data classification to said data storage for a post-flight assessment, wherein said first data classification is different from said second data classification.

4. The aircraft of claim 3, wherein each of said first aircraft light and said second aircraft light comprise a sensor and a sensor data transmitter.

5. The aircraft of claim 3, wherein each of said first aircraft light and said second aircraft light are operatively interconnected with said health monitoring module by a communication link selected from the group consisting of a wired communication link and a wireless communication link.

6. The aircraft of claim 3, wherein said output health status communication pertains to said sensor data of said first data classification and a corresponding aircraft light.

7. The aircraft of claim 6, further comprising:
a display, wherein said health status communication is presented on said display in response to said CPU being disposed from said sleep mode.

8. A method of monitoring an aircraft lighting system, comprising:
monitoring a first aircraft light;
transmitting data from said monitoring of said first aircraft light to a health monitoring module of an aircraft lighting health monitoring system;
monitoring a second aircraft light;
transmitting data from said monitoring of second first aircraft light to said health monitoring module;
determining a classification of said data received by said health monitoring module, wherein said determining comprises determining whether said data is at least one of a first data classification or a second data classification, and wherein said health monitoring module comprises
a controller, which in turn comprises a central processing unit (CPU) capable of being disposed of in at least one of in an active mode or a sleep mode and a data storage module, and
a separate direct memory access (DMA) controller;
disposing said CPU from said sleep mode in response to said data being of said first data classification from said determining;
assessing, by said CPU, said data of said first data classification in response to said CPU being disposed from said sleep mode;
outputting a health status communication pertaining to said data of said first data classification and a corresponding aircraft light in response to said CPU being disposed from said sleep mode;
transmitting said health status communication to a display and presenting said health status communication on said display in response to said CPU being disposed from said sleep mode;
maintaining said CPU in said sleep mode in response to said data being of said second data classification from said determining; and
using said DMA controller, in response to said data being of said second data classification, to transfer said data, received by said health monitoring module, to data storage for a post-flight assessment.

* * * * *

UNITED STATES PATENT AND TRADEMARK OFFICE
CERTIFICATE OF CORRECTION

PATENT NO. : 12,091,188 B2  
APPLICATION NO. : 17/134338  
DATED : September 17, 2024  
INVENTOR(S) : Elangovan Palaniappan

Page 1 of 1

It is certified that error appears in the above-identified patent and that said Letters Patent is hereby corrected as shown below:

In the Claims

Claim 2, Column 13, Line 24, delete "pertains pertaining" and insert --pertains--

Signed and Sealed this  
Twenty-sixth Day of November, 2024

Katherine Kelly Vidal  
*Director of the United States Patent and Trademark Office*